(12) United States Patent  
Ptasinski et al.

(10) Patent No.: US 8,217,382 B1
(45) Date of Patent: Jul. 10, 2012

(54) OPTICAL-POWERED FLEXIBLE PHOTONIC BANDGAP SENSOR DEVICE

(75) Inventors: Joanna N. Ptasinski, San Diego, CA (US); Stephen D. Russell, San Diego, CA (US); J. Scott Rodgers, Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 186 days.

(21) Appl. No.: 12/715,241

(22) Filed: Mar. 1, 2010

Related U.S. Application Data (63) Continuation-in-part of application No. 12/464,769, filed on May 12, 2009.

(51) Int. Cl.
*H01L 29/06* (2006.01)

(52) U.S. Cl. ............ 257/21; 257/22; 257/184; 385/129; 349/43; 349/151

(58) Field of Classification Search ............ 257/21, 257/22, 184; 385/129; 349/43, 151
See application file for complete search history.

(56) References Cited

U.S. PATENT DOCUMENTS

| | | | |
|---|---|---|---|
| 6,274,293 B1 | 8/2001 | Gupta et al. | |
| 7,194,175 B1 | 3/2007 | Rodgers et al. | |
| 7,274,413 B1 | 9/2007 | Sullivan et al. | |
| 7,315,675 B2 | 1/2008 | Harrington et al. | |
| 2008/0128618 A1* | 6/2008 | Rahman et al. | 250/332 |

* cited by examiner

*Primary Examiner* — Long Pham
(74) *Attorney, Agent, or Firm* — Ryan J. Friedl; Kyle Eppele

(57) ABSTRACT

An optical-powered device includes a flexible substrate, a photonic bandgap layer coupled thereto, a waveguide contained within the photonic bandgap layer, and a dendrimer region contained within the waveguide. The dendrimer region may comprise more than one dendrimers. The dendrimer region emission band is within the photonic bandgap of the photonic bandgap layer. Multiple photonic bandgap layers may be included, with one or more waveguides therein. Each waveguide may have a dendrimer region therein. Electronic circuitry may be contained within a portion of the photonic bandgap layer. A light-modulating layer may be directly coupled to the photonic bandgap layer. A portion of the photonic bandgap layer may have a sensing material embedded therein. A cover layer having one or more windows may be coupled to the photonic bandgap layer. Another layer, such as a buffer layer, may be disposed between the substrate layer and the photonic bandgap layer.

17 Claims, 9 Drawing Sheets

OPTICAL-POWERED FLEXIBLE PHOTONIC BANDGAP SENSOR DEVICE

CROSS-REFERENCES TO RELATED APPLICATIONS

This application is a continuation-in-part of commonly-assigned U.S. application Ser. No. 12/464,769, filed May 12, 2009, entitled "Flexible Photonic Bandgap Sensor Device," the entire content of which is fully incorporated by reference herein.

FEDERALLY SPONSORED RESEARCH AND DEVELOPMENT

The Optical-Powered Flexible Photonic Bandgap Sensor Device is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice (619) 553-2778; email ssc_pac_T2@navy.mil. Reference Navy Case No. 100223.

BACKGROUND

Monolithic optical sources and associated control electronics are desired to assist in overcoming the barrier to practical, wafer-scale optoelectronic devices such as optical backplanes with a high data rate (>1 Gbit/sec). An advanced photonic mixed signal parallel interconnect transceiver would be suitable for multi-functional RF analog optical links and high-capacity digital data transmission for very short distance interconnections. While light-emitting devices monolithically formed with passive photonic devices are still in their infancy, the importance of having monolithically integrated components and fabrication methods to exploit their unique capabilities cannot be minimized.

Photonic crystals are materials that have a set of wavelengths that are forbidden to propagate in the crystal, i.e. a photonic bandgap, similar to the bandgap found in semiconductors. Photonic crystals, and photonic bandgap devices comprised of photonic crystals, have potential applications in the areas of high bandwidth, free-space or fiber-based, covert optical communication systems (modulation, beam-steering); surveillance (optical beam-steering); sensors (hyperspectral filtering); and informational security (photonic logic and routing for encryption).

Optical waveguides can be fabricated within the photonic crystal by adding defects to the crystal so that a frequency in the photonic gap will be allowed along the defect. These photonic crystal waveguides can be made small with sharp bends, thereby decreasing the size of optical devices to a point where integrated optical circuits can be created. Photonic crystals may also be highly dispersive. At frequencies near the bandgap, the highly dispersive effects of the photonic crystal may be used to produce lenses or "super prisms", where a small change in input angle results in a very large change in output angle for applications such as extremely high resolution sensors or beam steering.

The ability to monolithically integrate photonic bandgap devices and associated control electronics could assist in overcoming the barrier to practical, wafer-scale optoelectronic devices such as optical backplanes with a high data rate (>1 Gbit/sec). In addition, there is a growing requirement for a technology that is compatible with non-planar surfaces. Such devices could be affixed to curved surfaces, used in wearable computer systems, or for highly portable applications such as rolled-up devices. Current photonic bandgap materials are inherently planar in nature and non-flexible.

There is a need for a flexible photonic bandgap device that may be unrolled into deployment or conformed to non-planar surfaces to meet emerging applications for non-planar devices. Further, there is a need for such flexible photonic bandgap device to be free from power constraints imposed by limited power sources.

DETAILED DESCRIPTION OF SOME EMBODIMENTS

Figure 1:
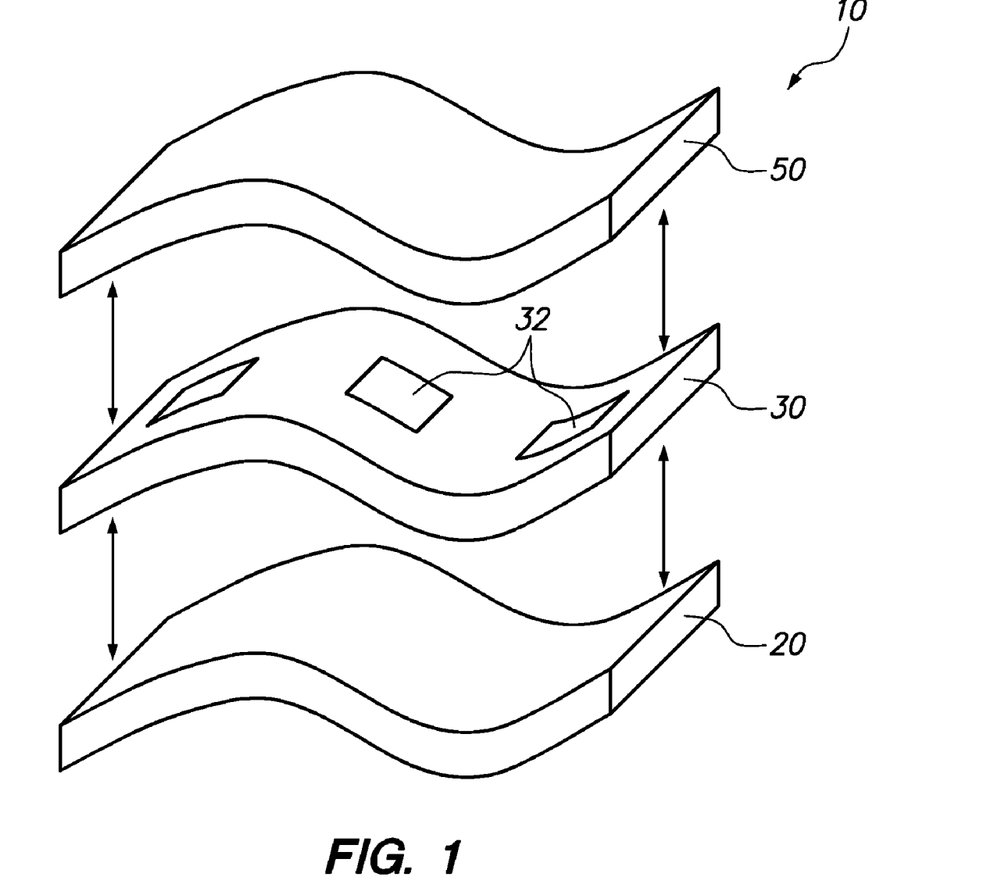
FIG. 1 shows an exploded diagram of an embodiment of a device in accordance with the Optical-Powered Flexible Photonic Bandgap Sensor Device.

FIG. 1 shows an exploded diagram of an embodiment of a device 10 in accordance with the Optical-Powered Flexible Photonic Bandgap Sensor Device. Device 10 may include a flexible substrate 20 and a photonic bandgap layer 30 directly coupled to flexible substrate 20. Photonic bandgap layer 30 contains at least a portion of a photonic crystal structure. In some embodiments, flexible substrate 20 has a thickness less than or equal to about 10 μm and a fracture radius less than or equal to about 10 mm. In some embodiments, flexible substrate 20 comprises a polymer. As an example, flexible substrate 20 may be comprised of a polyimide in the thickness range 1,000 nm to 50,000 nm (50 μm).

In other embodiments, photonic bandgap layer 30 comprises a semiconductor layer over an insulator layer. In such embodiments, the semiconductor layer may comprise a semiconductor such as silicon, germanium or their alloys, while the insulator layer comprises an insulator such as quartz, silicon dioxide, silicon nitride or sapphire. The semiconductor layer may be comprised of single-crystal silicon having a thickness between about 10 nm and about 4500 nm. Using silicon dioxide as an example of an insulator layer, the silicon dioxide layer may have a thickness in the range of about 10 nm to 2,000 nm. More specifically, a 220 nm thick single-crystal silicon semiconductor layer may be disposed over a 380 nm thick silicon dioxide insulator layer.

Device 10 may further include electronic circuitry 32 contained within at least a portion of photonic bandgap layer 30. Electronic circuitry 32 allows for electrical connection of photonic bandgap layer 30 to other electrical circuits outside of photonic bandgap layer 30. Electronic circuitry 32 may be formed within photonic bandgap layer 30 using techniques commonly practiced in the field of microelectronics fabrication. Additional electronic, optical, or electromagnetic interfaces with electronic circuitry 32 may also be provided within device 10 to suit the particular application for which device 10 is used.

Similarly, suitable interconnections between electronic circuitry 32 and photonic bandgap device 10 may be formed within photonic bandgap layer 30 such as photodiodes, phototransistors and the like, to convert electromagnetic energy (such as visible or infrared light) to electrical signals or, conversely, electroluminescent devices, light emitting diodes, or semiconductor lasers, and the like, to convert electrical signals to electromagnetic energy (such as visible or infrared light). In some embodiments, electronic circuitry 32 may include polycrystalline silicon gate structures having, for example a thickness of 380 nm, contact oxide for dielectric isolation between metallic contacts of 350 nm thickness, and a silicon dioxide thickness of 1,200 nm (1.2 pn). Electronic circuitry 32 may be formed within photonic bandgap layer 30 using techniques commonly practiced in the field of microelectronics fabrication. Electronic circuitry 32 may be designed to store, condition or distribute the converted optical power which was absorbed by the dendrimer regions of the present invention.

Photonic bandgap layer 30 is configured to allow optical propagation therein. Such a configuration may include, for example, having a waveguide 42 (shown in FIG. 3) contained within photonic bandgap layer 30. Photonic bandgap layer 30 also provides the ability for device 10 to route and process optical signals, which occurs within photonic bandgap layer 30. In some embodiments, waveguide 42 may have one or more dendrimer regions therein (as shown in FIGS. 8-12).

In some embodiments, device 10 further includes a light-modulating layer 50 directly coupled to photonic bandgap layer 30. Light-modulating layer 50 may be configured to perform photonic functions, such as filtering, frequency selectivity, signal encoding, sensing and pulse delay. In some embodiments, light-modulating layer 50 may be comprised of sub-layers, including, for example, contact electrodes, light-emitting materials such as organic polymers or electroluminescent semiconductor nanostructures, liquid crystal materials with alignment layers, color filters, and the like.

Figure 7:
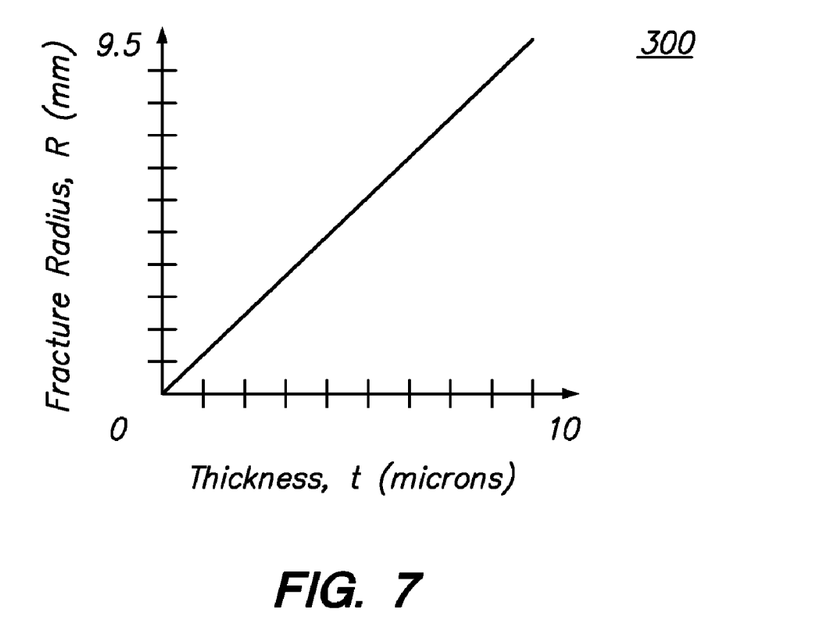
FIG. 7 shows a graph of fracture radius versus thickness for silicon having a thickness less than 10 microns.

Device 10 allows for a photonic crystal device having flexibility that allows device 10 to be bonded to conformal surfaces with a small radius of curvature. As an example, device 10 may be rolled into cylinders of 1 to 2 mm in diameter. To illustrate, the fracture radius of silicon can be expressed as:

$$R \text{ (mm)}=(E*10)*t \text{ (μm)}/(2*\text{Tensile Strength})=0.94*t \text{ (μm)}$$

where E=Young's Modulus=188 Gpa and Tensile Strength=100 Mpa. A graph of the calculated fracture radius versus thickness is shown in FIG. 7, such graph illustrating fracture radius values of between 0 and 10 mm for thicknesses of between 0 and 10 microns.

Figure 2:
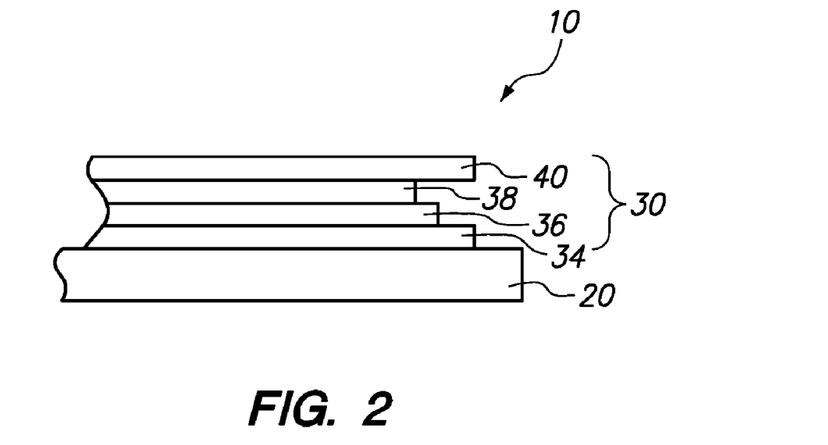
FIG. 2 shows a diagram of an embodiment of a three-dimensional photonic bandgap layer for use within a device in accordance with the Optical-Powered Flexible Photonic Bandgap Sensor Device.

Referring to FIG. 2, photonic bandgap layer 30 may comprise a three-dimensional photonic bandgap structure having a plurality of honeycomb-like structures. The honey-comb structures may be similar to such structures as described in U.S. Pat. No. 7,194,175 to Rodgers et al., the entire content of which is incorporated by reference herein. Each honeycomb-like structure may have high index regions and low index regions, wherein, for example, the high index regions comprise semiconductor material and the low index regions comprise air. In some embodiments of device 10, photonic bandgap layer 30 may contain at least four honeycomb-like structures layered over each other. In such configurations, a second honeycomb-like structure 36 is offset from a first honeycomb-like structure 34, a third honeycomb-like structure 38 is offset from second honeycomb-like structure 36, and a fourth honeycomb-like structure 40 is not offset from first honeycomb-like structure 34.

In embodiments of photonic bandgap layer 30 containing a waveguide with one or more dendrimer regions, the waveguide and dendrimer region(s) may be formed in layers 34, 36, 38, and 40 when such layers are configured to absorb optical energy. Such configuration may include at least partially transmissive covering layers or patterned open regions in covering layers which provides for absorption of optical energy.

Figure 3:
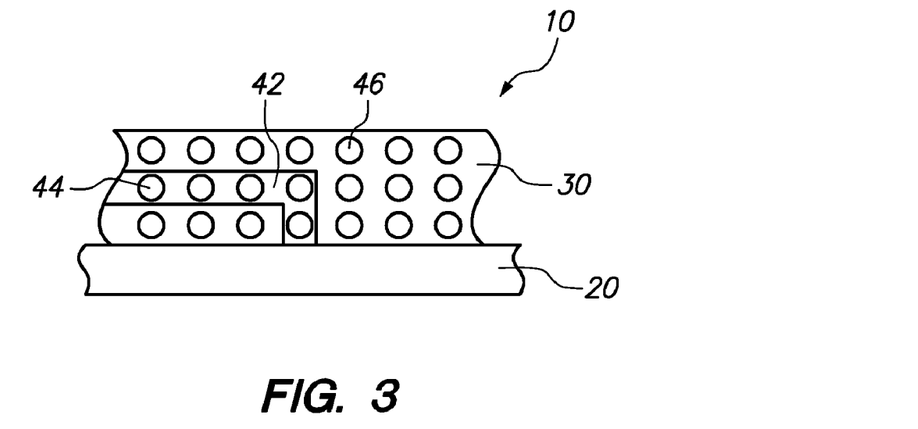
FIG. 3 shows a cross-section view of a portion of an embodiment of a three-dimensional photonic bandgap layer having a waveguide therein, in accordance with the Optical-Powered Flexible Photonic Bandgap Sensor Device.

FIG. 3 shows a cross-section view of a portion of a three-dimensional bandgap layer 30 having a waveguide 42 therein. Waveguide 42 may be formed by standard nanofabrication techniques where the waveguiding region may be defined using a photolithographic mask process and each layer subsequently etched to form the 3-D layers of the structure. Waveguide 42 allows for the control of the optical signal routing. In some embodiments, waveguide element 44 may be different in structure from the periodic modulation element 46. In other embodiments, waveguide element 44 may be completely absent from region 42.

Figure 4:
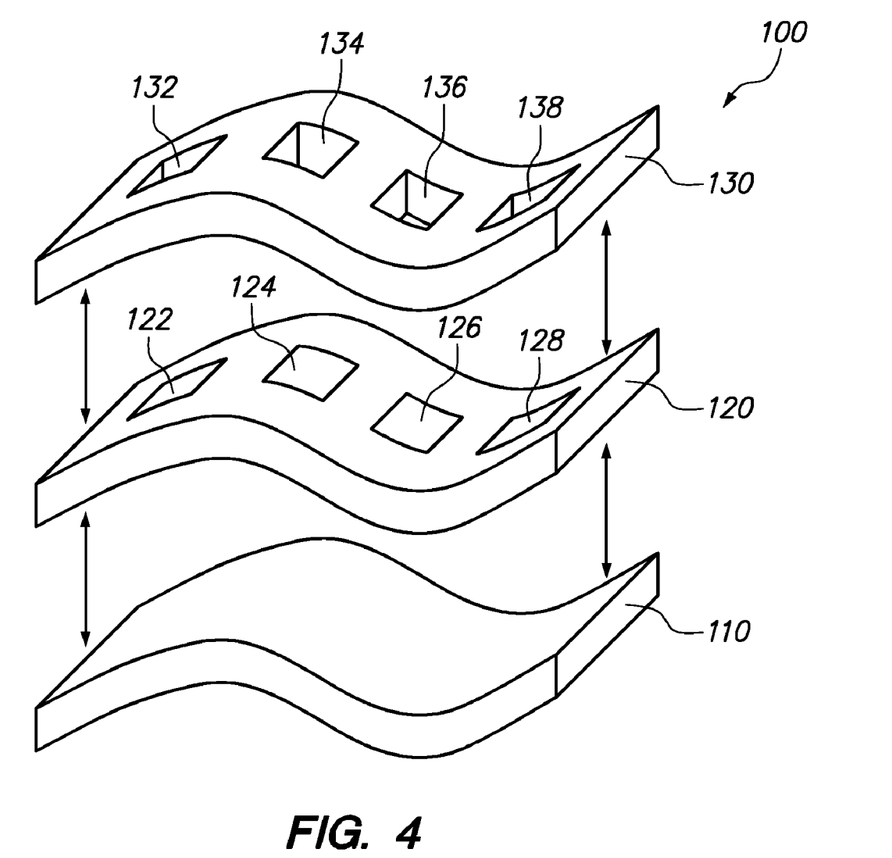
FIG. 4 shows an exploded diagram of an embodiment of another device in accordance with the Optical-Powered Flexible Photonic Bandgap Sensor Device.

FIG. 4 shows an exploded diagram of an embodiment of a device 100 in accordance with the Optical-Powered Flexible Photonic Bandgap Sensor Device. Device 100 may include a flexible substrate 110, a photonic bandgap layer 120 directly coupled to flexible substrate 110, and a sensing material, such as sensing materials 122, 124, 126, or 128, fixed to or embedded within at least a portion of photonic bandgap layer 120. In some embodiments, the amount of sensing material embedded in photonic bandgap layer 120 is sufficient to change the refractive index of photonic bandgap layer 120. In some embodiments, the sensing material may be interspersed throughout photonic bandgap layer 120. In other embodiments, the sensing material may be selectively located within photonic bandgap layer 120. Photonic bandgap layer 120 may further include one or more waveguides therein, with each waveguide including at least one dendrimer region (see FIGS. 8-12).

Examples of sensing material include, but are not limited to: photo-sensitive polymers, surface-treated nanoparticles, bio-sensitive materials such as hydrogels (such as glucose-sensitive gels), receptor proteins, antibodies, antigens, and enzymes; light sensitive materials such doped glasses, nano-particle materials, UV sensitive materials (Ge doped $SiO_2$), liquid crystals (sensitive to RF and low frequency fields), metal doped glasses, and meta materials sensitive to very strong electromagnetic fields.

The addition of sensing materials, such as those that change refractive index when exposed to light, ionizing radiation, chemicals or biological agents, may be applied to alter the transmission properties of photonic crystal layer 120. The amount of such sensing materials added may vary depending on the degree of change of refractive index desired. Such sensing materials may be integrally formed within photonic bandgap layer 120, either during the fabrication process, or incorporated after the basic structure is formed. Alternately, the sensitive materials may be located above or on photonic crystal layer 120.

Device 100 may further include cover layer 130 coupled directly to photonic bandgap layer 120. As an example, cover layer 130 may be comprised of polymers such as polydimethylsiloxane (PDMS). In some embodiments, cover layer 130 contains a window therein, such as window 132, 134, 136, or 138. In embodiments of cover layer 130 having a window, cover layer 130 may be coupled to photonic bandgap layer 130 such that the window is aligned with a portion of photonic bandgap layer 120 having sensing material embedded therein. In some embodiments, the window is patterned from cover layer 130. In other embodiments, the window is formed within cover layer 130, and may comprise a region that is translucent, permeable, or sensitive to particular materials. As an example, a window contained within cover layer 130 may be comprised of PDMS, poly vinyl cinnamate, Epoxy/Methacrylic Acid (MAA), or other polymers. Another example is a window absent any material, i.e. a void formed by patterning cover layer 130.

In some embodiments, photonic bandgap layer 120 includes a plurality of different sensing materials embedded in different locations therein. For example, as shown in FIG. 4, sensing material 122 may comprise one type of sensing material, sensing material 124 may comprise another type of sensing material, and so on for sensing materials 126 and 128. In such embodiments, cover layer 130 may contain a plurality of windows therein, such as windows 132, 134, 136, and 138, with cover layer 130 coupled to photonic bandgap layer 120 such that each window is aligned with a portion of photonic bandgap layer 120 having a sensing material embedded therein. In embodiments wherein sensing material 120 is interspersed throughout photonic bandgap layer 130, cover layer 130 may comprise a material that is translucent or permeable to a constituent to be sensed by the sensing material.

In some embodiments, photonic crystal layer 120 comprises two periodic materials, wherein one periodic material has a refractive index greater than the other. The sensing material may be one of these periodic materials. In their normal states, the two materials form a photonic crystal that guides or transmits light at certain set of frequencies and with specific properties, such as dispersion and phase. Exposure to the characteristic (light, chemical, radiation, biological agent, etc.) being sensed causes a change in refractive index in the sensing material that results in a change to the specific properties of the material which can be detected, or to the frequencies that are transmitted or guided.

Figure 5:
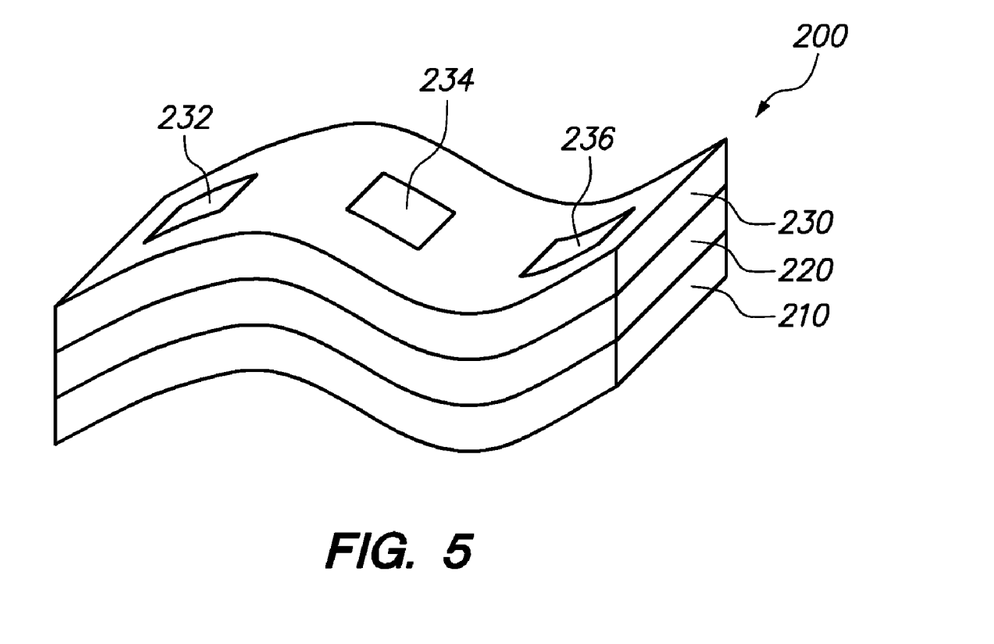
FIG. 5 shows a diagram of an embodiment of another device in accordance with the Optical-Powered Flexible Photonic Bandgap Sensor Device.

FIG. 5 shows a diagram of an embodiment of a device 200 in accordance with the Optical-Powered Flexible Photonic Bandgap Sensor Device. Device 200 may include a flexible substrate 210, a first layer 220 directly coupled to flexible substrate 210, and a photonic bandgap layer 230 directly coupled to first layer 220. At least a portion of photonic bandgap layer 230 includes a sensing material, such as material 232, 234, or 236, fixed to or embedded therein. In some embodiments, first layer 220 is a buffer layer. The material used for such a buffer layer may vary depending upon the materials used for flexible substrate 210 and photonic bandgap layer 230. As an example, in a device 200 having a flexible substrate comprised of a polyimide layer and a photonic bandgap layer comprised of silicon, silica, silicon on silicon dioxide or other dielectric material, first layer 220 may be comprised of a metallic nanohole array which would be used for sensing.

In other embodiments, first layer 220 comprises a metallic material having corrugations therein. An example of such a layer having corrugations may be found in U.S. Pat. No. 7,457,501 to Ptasinski et al., the entire content of which is incorporated by reference herein. First layer 220 may have a thickness, for example, that is less than about 100 nm.

Figure 6A:
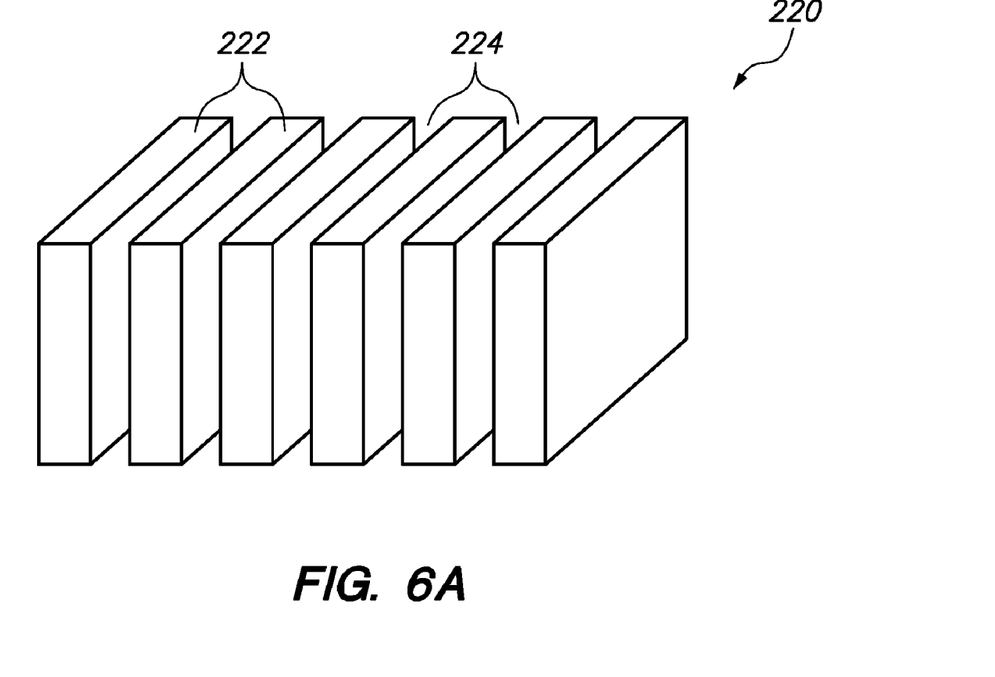
FIG. 6A shows a side perspective view of an embodiment of a plasmonic layer for use within a device in accordance with the Optical-Powered Flexible Photonic Bandgap Sensor Device.
Figure 6B:
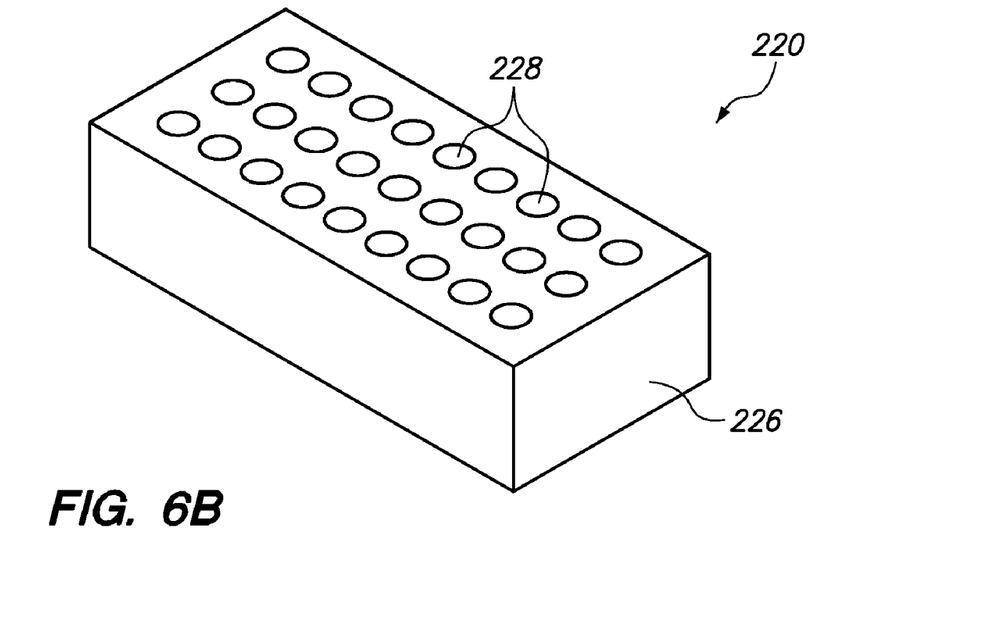
FIG. 6B shows a top perspective view of another embodiment of a plasmonic layer for use within a device in accordance with the Optical-Powered Flexible Photonic Bandgap Sensor Device.

FIG. 6A shows a side perspective view of an embodiment of first layer 220. As shown, first layer 220 is a plasmonic layer having a line grating configuration. In such configuration, first layer 220 has conductive portions 222 for example comprised of aluminum, silver, gold, metallic alloys and the like and spaces 224 forming dielectric spacers which may be air or insulators such as silicon dioxide, silicon nitride and the like FIG. 6B shows a top perspective view of another embodiment of first layer 220. As shown, first layer 220 is a plasmonic layer comprising a substrate 226 with a hole array therein, the hole array comprised of holes 228. Another example of first layer 220 may have corrugations therein (not shown). In such configuration, layer 220 may have ridges and grooves that form the corrugations. In some embodiments, the corrugations are aperiodic. In other embodiments, the corrugations have unequal cross-sections. In some embodiments, first layer 220 only has corrugations on one side. In other embodiments the corrugations may be etched all the way through to the material below. The corrugations serve to excite surface plasmons at the metal/dielectric interface formed between the metal and photonic bandgap layer 220.

Figure 8:
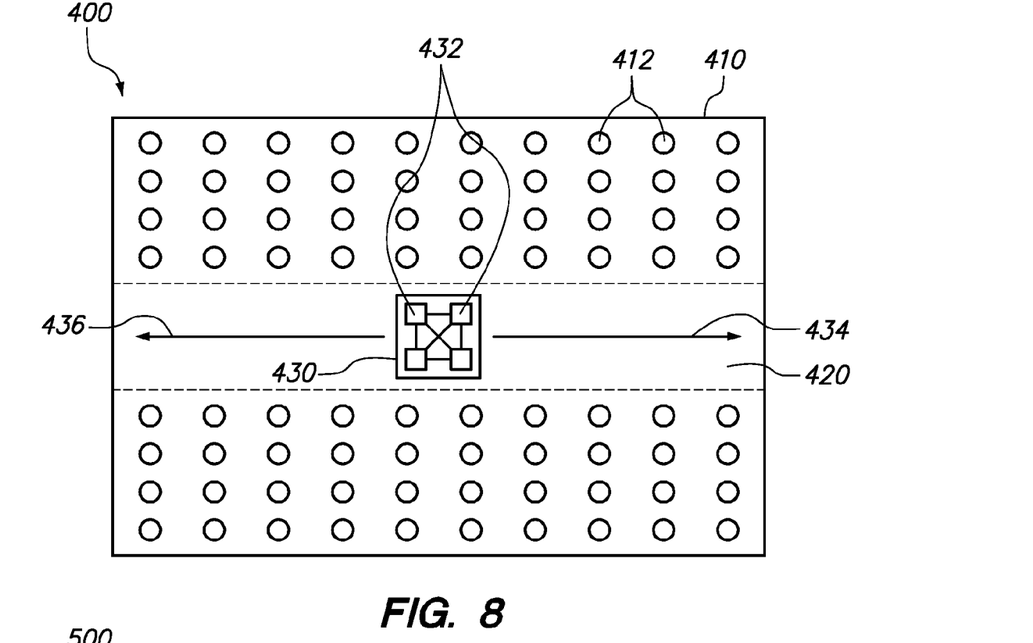
FIG. 8 shows a top view of an embodiment of a device having a photonic bandgap layer with a waveguide having a dendrimer region therein, in accordance with the Optical-Powered Flexible Photonic Bandgap Sensor Device.

FIG. 8 shows a top view of an embodiment of a device 400 having a photonic bandgap layer 410 with a waveguide 420 having a dendrimer region 430 therein, in accordance with the Optical-Powered Flexible Photonic Bandgap Sensor Device. Photonic bandgap layer 410 includes a plurality of periodic modulation elements 412 arranged in a uniform lattice structure therein. In some embodiments, dendrimer region 430 is located at the end of waveguide 420. In other embodiments, dendrimer region 430 is located at any other location within waveguide 420, such as in the middle as shown. Dendrimer region 430 may be located at or near the top surface of photonic bandgap layer 410. In other embodiments, dendrimer region 430 is located a predetermined distance below the top surface of photonic bandgap layer 430. In some embodiments, dendrimer region 430 may comprise more than one dendrimers 432. In some embodiments, the dendrimer region 430 may be operably coupled to electronic circuitry 32 to store, condition or distribute the converted optical power which was absorbed by the dendrimer regions 430.

Dendrimers are repeatedly branched molecules with very well defined chemical structures. They are nearly perfect mono-disperse macromolecules of a three dimensional, highly branched architecture. Dendrimers are perfectly homo-disperse, meaning that every dendrimer molecule in a sample has exactly the same mass. Size, shape, and reactivity are determined by generation (shells) and chemical composition of the core, interior branching, and surface functionalities. Dendrimers are constructed through a set of repeating chemical synthesis procedures that build up from the molecular level to the nanoscale region under conditions that can be readily performed in a standard organic chemistry laboratory by those having ordinary skill in the art.

Light harvesting dendrimers allow for the trapping of energy via peripheral chromophores and funneling to a central point where it is converted back into visible light. The properties of light harvesting dendrimers include a tree-like structure that acts as an energy gradient for the funneling of energy, where a large amount of absorbing units on the periphery gives a high probability of light capture. A relatively short distance from the periphery to the core allows for high efficiency energy transfer. This efficiency has been shown to be as high as 98% in a phenylacetylene dendrimer. The mechanism of energy transfer observed in dendrimers is typically fluorescence or Förster resonance energy transfer (FRET). FRET is the radiationless transfer of excitation energy from a donor chromophore to an acceptor chromophore through long range dipole-dipole coupling.

Engineering photonic bandgap devices containing light harvesting dendrimers will allow for the realization of optical powered optical chips and other photonic devices on a chip-scale. Sources of optical power that may be absorbed by the dendrimers include the sun, incandescent light sources, light-emitting diodes and lasers. Dendrimers may be integrated with micro-electronic devices such as logic circuitry, electronic detectors, photonic detectors, optical logic, and display devices. Dendrimers have the ability to trap energy at a particular frequency and to convert it back to visible light at a different frequency. A photonic bandgap structure designed to operate at a particular frequency could readily be powered using embedded dendrimers.

Figure 10A:
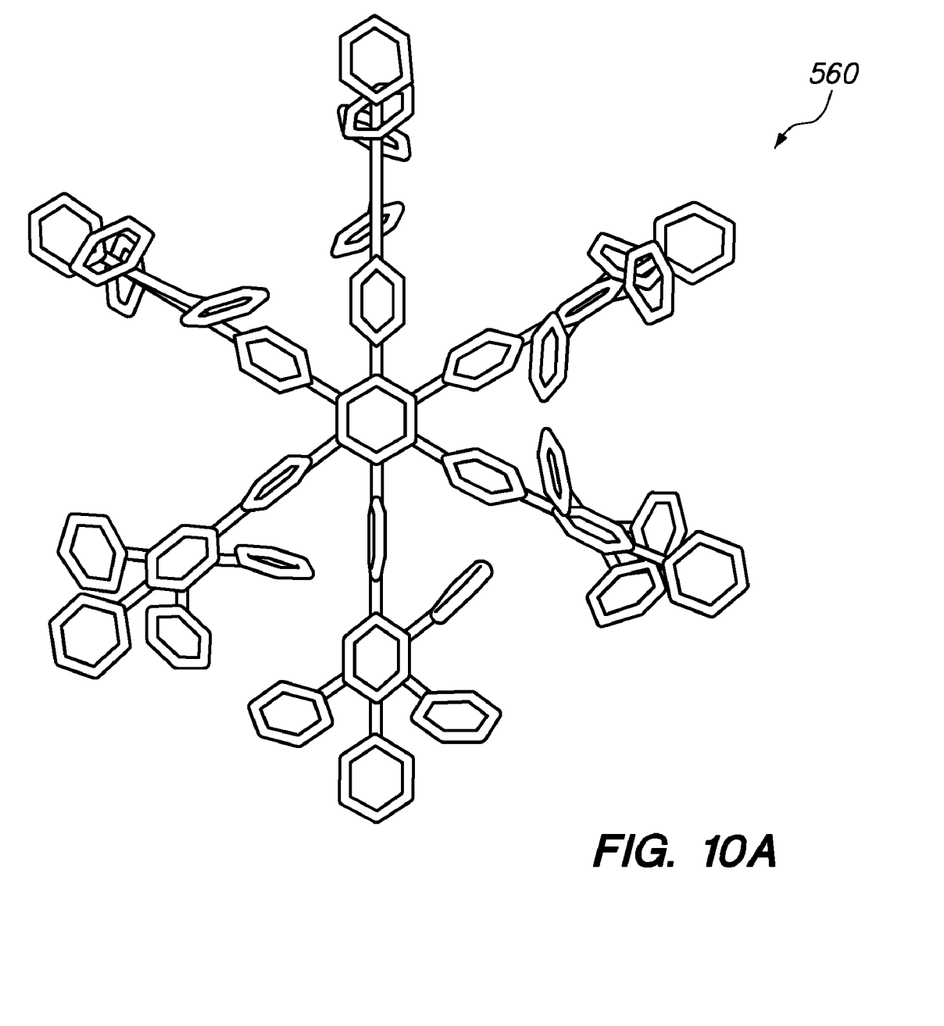
FIGS. 10A and 10B show front views of examples of dendrimer structures that may be contained within a dendrimer region, in accordance with the Optical-Powered Flexible Photonic Bandgap Sensor Device.
Figure 10B:
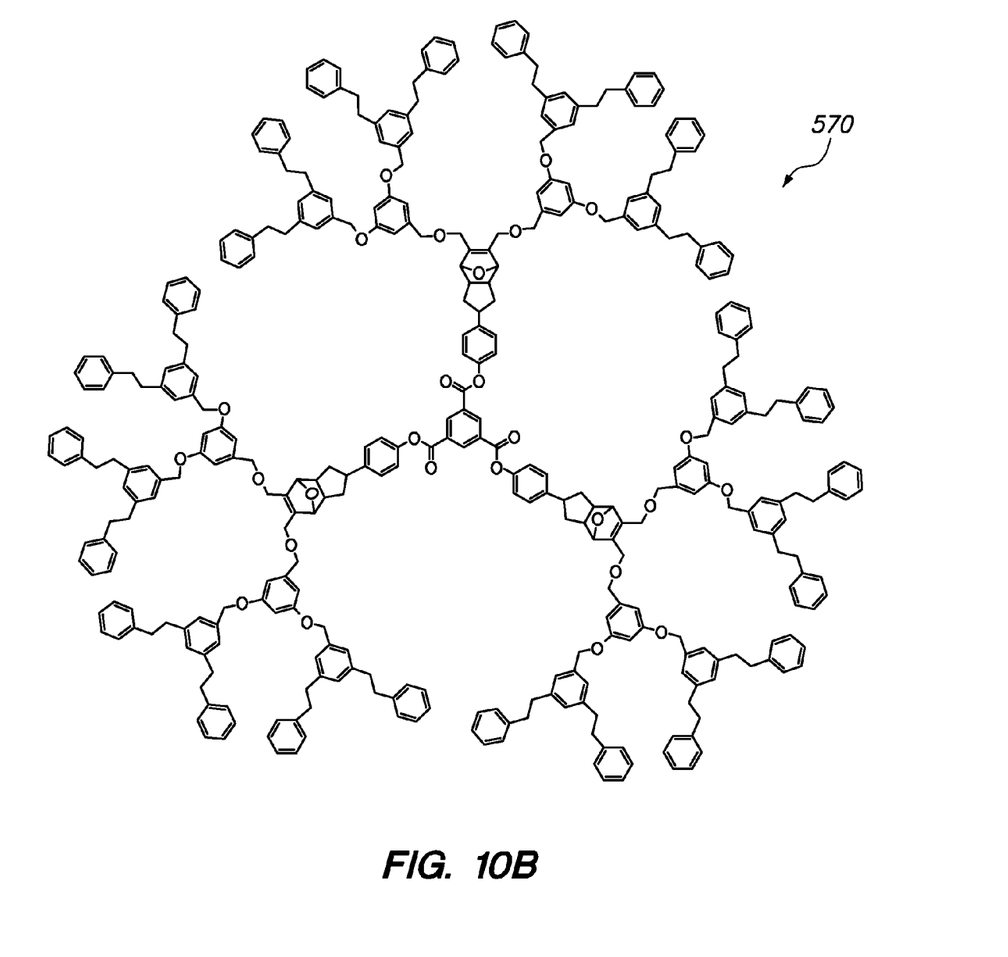

Non-limiting examples of dendrimer structures 432 are shown in FIGS. 10A and 10B. Dendrimers 432 may be connected, as shown, or may be grouped together within dendrimer region 430. Those having ordinary skill in the art will recognize that many dendrimer structures exist and can be incorporated within dendrimer region 430 to produce a dendrimer region having particular absorption and emission bands. An emission wavelength of dendrimer region 430 is within the photonic bandgap of photonic bandgap layer 410. As an example, a dendrimer region 430 having an emission band of 580 nm would be suitable for a photonic bandgap layer 410 having a photonic bandgap of between 500 nm and 600 nm. It should be recognized that dendrimer region 430 may be configured such that its emission band lies at any point within the range of about 400 nm to about 900 nm. Further, dendrimer region 430 may be configured such that its absorption band lies at any points within the range of about 100 nm to about 1600 nm. In some embodiments, dendrimer region 430 may have multiple absorption bands. For example, dendrimer region 430 may be configured such that it can absorb solar energy at both 405 nm and 815 nm.

Dendrimer region 430 is configured to emit optical signals 434 and 436. Such signals are routed through waveguide 420 to the various electronic/opto-electronic components contained within photonic bandgap layer 410 or an adjacent photonic bandgap layer disposed either above or below photonic bandgap layer 410.

Figure 9:
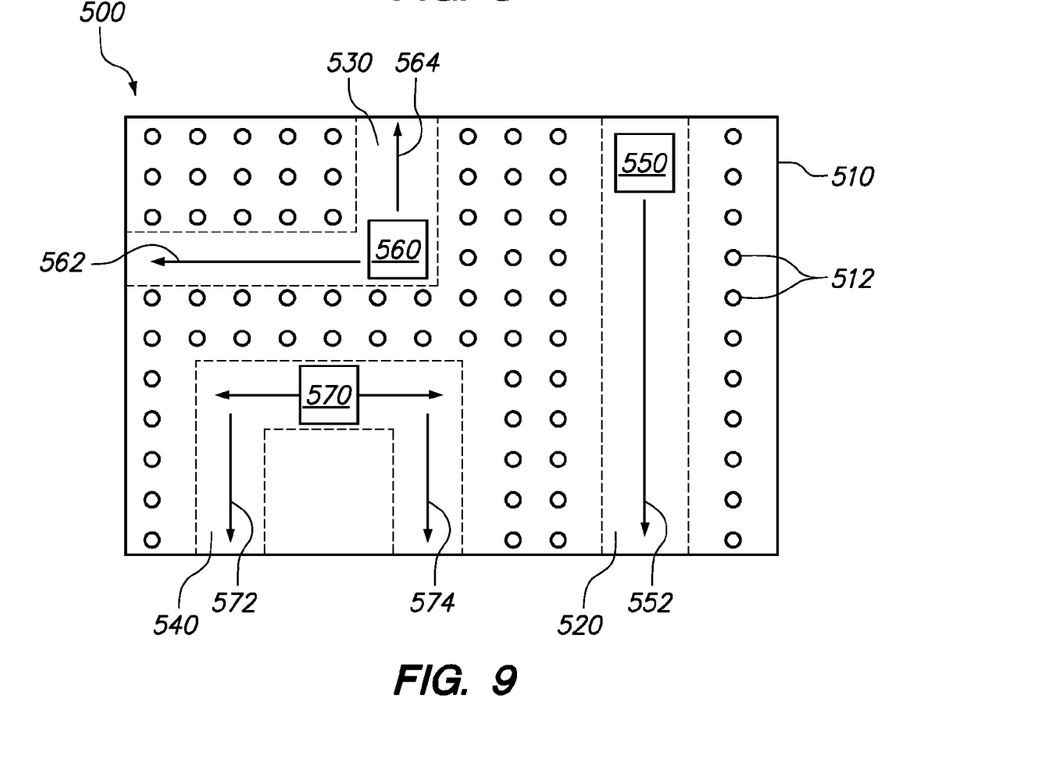
FIG. 9 shows a top view of an embodiment of a device having a photonic bandgap layer with multiple waveguides and multiple dendrimer regions, in accordance with the Optical-Powered Flexible Photonic Bandgap Sensor Device.

FIG. 9 shows a top view of an embodiment of a device 500 having a photonic bandgap layer 510 with multiple waveguides and multiple dendrimer regions, in accordance with the Optical-Powered Flexible Photonic Bandgap Sensor Device. Photonic bandgap layer 510 may include a plurality of periodic modulation elements 512 arranged in a uniform lattice structure therein, as well as waveguides 520, 530, and 540, having a dendrimer region 550, 560, and 570, respectively, located therein. Dendrimer regions 550, 560, and 570 may be configured similarly to dendrimer region 430 as shown in FIG. 8.

Figure 11:
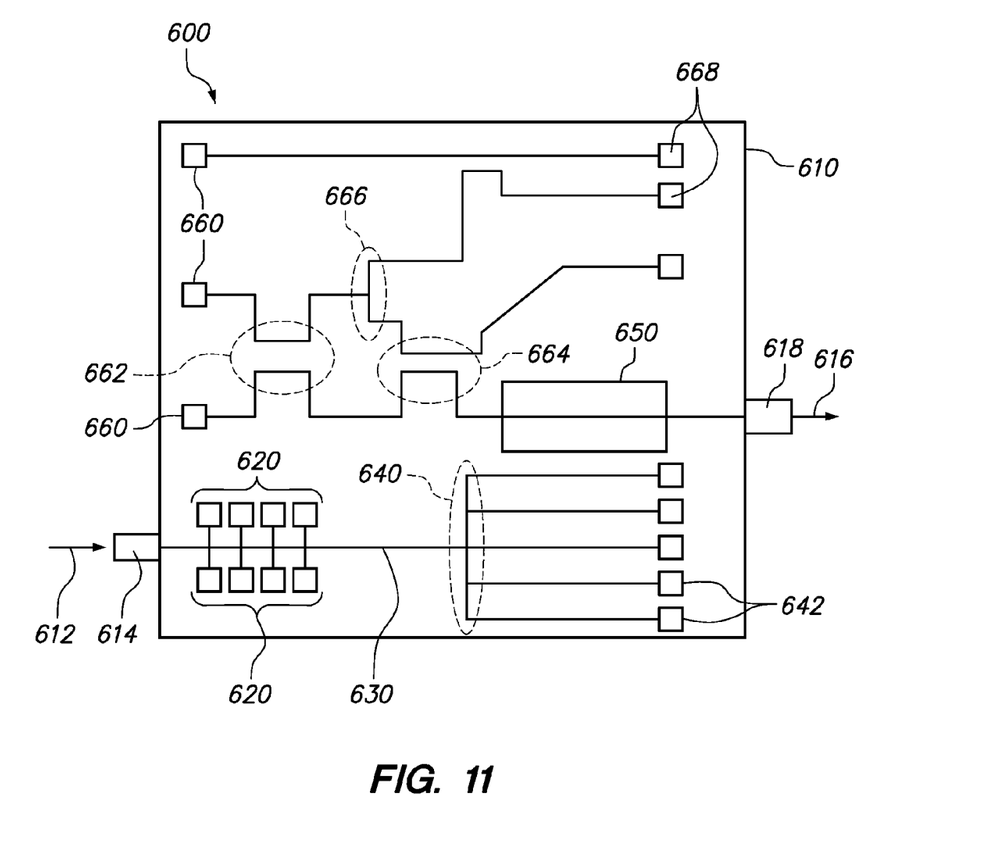
FIG. 11 shows a top view of an embodiment of a device having a photonic bandgap layer with multiple dendrimer regions, in accordance with the Optical-Powered Flexible Photonic Bandgap Sensor Device.

FIG. 11 shows a top view of an embodiment of a device 600 having a photonic bandgap layer 610 with multiple dendrimer regions, in accordance with the Optical-Powered Flexible Photonic Bandgap Sensor Device. Photonic bandgap layer 610 may receive an input signal 612 via an input connector 614 and transmit an output signal 616 via an output connector 618. Multiple dendrimer regions 620 may be located within a waveguide structure 630, which is connected to a hyperspectral filter 640 having connections 642 to detectors (not shown).

Photonic bandgap layer 610 may further include a sensor region 650. Sensor region 650 may be configured similarly to any of sensor regions 122, 124, 126, and 128 as shown in FIG. 4. Additional dendrimer regions 660 may be connected to waveguides that create couplers 662 and 664, as well as splitter 666. Some of the waveguides may terminate at connections 668, which may be connected to detectors (not shown). Another of the waveguides may be routed proximate to sensor region 650 and may terminate at output connector 618.

Figure 12:
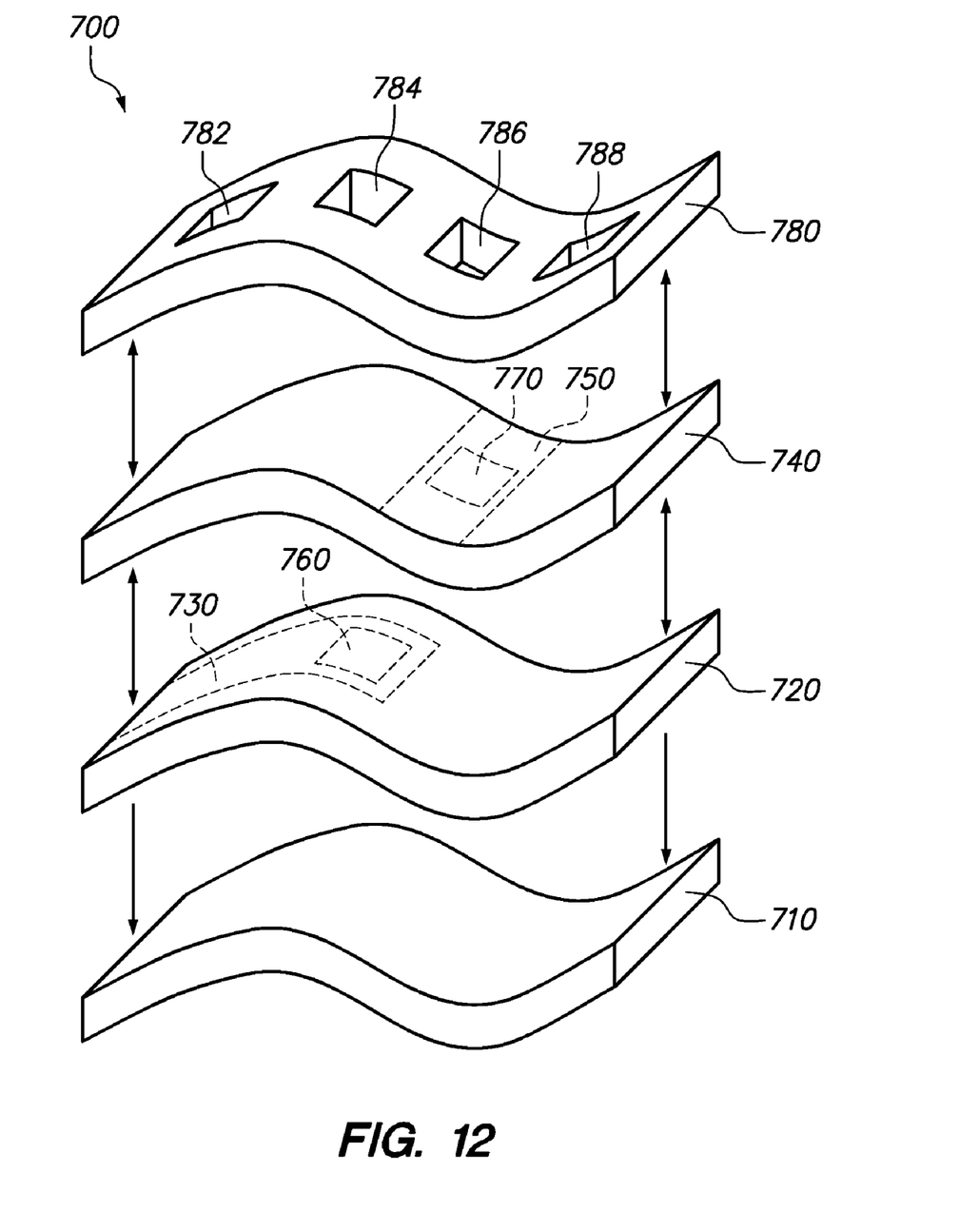
FIG. 12 shows an exploded diagram of an embodiment of a device having multiple photonic bandgap layers, in accordance with the Optical-Powered Flexible Photonic Bandgap Sensor Device.

The sensor regions may contain metallic grating structures allowing for the excitation of surface plasmons, or they may contain whispering gallery mode micro-structures, where both can be used to monitor adsorption or for bio-sensing. The whispering gallery mode micro-structures are especially well suited for single molecule detection. The sensing regions may also be coated with an immobilized micro-gel such as glutathione-S-transferase for the detection of carcinogens, or silver and gold nanoparticles for ascorbic acid or antibody/antigen sensing. The dendrimer output is routed to and provides the necessary energy/optical signals needed to monitor the sensing regions FIG. 12 shows an exploded diagram of an embodiment of a device 700 having multiple photonic bandgap layers, in accordance with the Optical-Powered Flexible Photonic Bandgap Sensor Device. Device 700 may include a flexible substrate 710, a first photonic bandgap layer 720 directly coupled to flexible substrate 710, and a second photonic bandgap layer 740 directly coupled to first photonic bandgap layer 720. In some embodiments, device 700 includes more than two photonic bandgap layers, depending upon the particular application. First photonic bandgap layer 720 may contain at least one waveguide 730 therein, while second photonic bandgap layer 740 may contain at least one waveguide 750 therein.

A dendrimer region 760 may be contained within waveguide 730 and a dendrimer region 770 may be contained within waveguide 750. Dendrimer region 760 may contain multiple dendrimers 762, while dendrimer region 770 may contain multiple dendrimers 772. In some embodiments, first photonic bandgap layer 720 and second photonic bandgap layer 740 may contain multiple waveguides therein. Further, in some embodiments, waveguides 730 and 750 may contain multiple dendrimer regions therein. Each of such dendrimer regions may contain one or more dendrimers.

In some embodiments, at least a portion of the top photonic bandgap layer (second photonic bandgap layer 740 as shown) has a sensing material embedded therein. The amount of sensing material embedded in second photonic bandgap layer 740 is sufficient to change the refractive index of second photonic bandgap layer 740. The types of sensing materials used may include a photo-sensitive polymer, a biological-sensitive material, and surface-treated nanoparticles.

Device 700 may further contain a cover layer 780 disposed over the top photonic bandgap layer. As shown, cover layer 780 is disposed over second photonic bandgap layer 740. Cover layer 780 may be configured similarly as cover layer 130 shown in FIG. 4. As such, cover layer 780 may include windows 782, 784, 786, and 788 therein. Such windows may be aligned with the portion of second photonic bandgap layer 740 having a sensing material (not shown) embedded therein.

Many modifications and variations of the Optical-Powered Flexible Photonic Bandgap Sensor Device are possible in light of the above description. Within the scope of the appended claims, the Optical-Powered Flexible Photonic Bandgap Sensor Device may be practiced otherwise than as specifically described. The scope of the claims is not limited to the implementations and embodiments disclosed herein, but extends to other implementations and embodiments as may be contemplated by those having ordinary skill in the art.

We claim:

1. A device comprising:
a flexible substrate;
a photonic bandgap layer directly coupled to the flexible substrate;
a plurality of waveguides contained within the photonic bandgap layer; and
at least one dendrimer region contained within each of the plurality of waveguides, wherein at least one of the dendrimer regions has an emission band different from at least another of the dendrimer regions.

2. The device of claim 1, wherein the dendrimer region comprises more than one dendrimer.

3. The device of claim 1, wherein the dendrimer region is located at an end of the waveguide.

4. The device of claim 1, wherein an emission band of the dendrimer region is within the photonic bandgap of the photonic bandgap layer.

5. The device of claim 1 further comprising a second photonic bandgap layer directly coupled to the photonic bandgap layer, the second photonic bandgap layer having a second waveguide contained therein, the second waveguide having a second dendrimer region contained therein.

6. The device of claim 1, wherein the photonic bandgap layer comprises a semiconductor layer over an insulator layer.

7. The device of claim 6, wherein the semiconductor layer comprises a semiconductor selected from the group of semiconductors consisting of silicon, germanium, and their alloys, and the insulator layer comprises an insulator selected from the group of insulators consisting of quartz, silicon dioxide, silicon nitride and sapphire.

8. The device of claim 1 further comprising electronic circuitry contained within at least a portion of the photonic bandgap layer.

9. The device of claim 1 further comprising a light-modulating layer directly coupled to the photonic bandgap layer.

10. A device comprising:
a flexible substrate;
a first photonic bandgap layer directly coupled to the flexible substrate;
a second photonic bandgap layer directly coupled to the first photonic bandgap layer, wherein at least a portion of the second photonic bandgap layer has a sensing material embedded therein, wherein the amount of sensing material embedded in the second photonic bandgap layer is sufficient to change the refractive index of the second photonic bandgap layer;
at least one waveguide contained within each of the first and second photonic bandgap layers; and
at least one dendrimer region contained within each of the waveguides, wherein the dendrimer regions comprise more than one dendrimers.

11. The device of claim 10, wherein the sensing material is selected from the group of sensing materials consisting of a photo-sensitive polymer, a biological-sensitive material, and surface-treated nanoparticles.

12. The device of claim 10 further comprising a cover layer coupled directly to the second photonic bandgap layer, the cover layer containing a window therein, wherein the cover layer is coupled to the second photonic bandgap layer such that the window is aligned with the portion of the second photonic bandgap layer having a sensing material embedded therein.

13. The device of claim 12, wherein the second photonic bandgap layer includes a plurality of different sensing materials embedded in different locations therein, the cover layer containing a plurality of windows therein, wherein the cover layer is coupled to the second photonic bandgap layer such that each window is aligned with a portion of the second photonic bandgap layer having a sensing material embedded therein.

14. A device comprising:
a flexible substrate;
a first layer directly coupled to the flexible substrate;
a photonic bandgap layer directly coupled to the first layer, at least a portion of the photonic bandgap layer having a sensing material embedded therein;
at least one waveguide contained within the photonic bandgap layer; and
at least one dendrimer region contained within the waveguide, wherein an emission band of the dendrimer region is within the photonic bandgap of the photonic bandgap layer.

15. The device of claim 14, wherein the first layer comprises a plasmonic layer having a line grating configuration.

16. The device of claim 14, wherein the dendrimer region comprises more than one dendrimers.

17. The device of claim 14 further comprising a cover layer coupled directly to the photonic bandgap layer, the cover layer containing a window therein, wherein the cover layer is coupled to the photonic bandgap layer such that the window is aligned with the portion of the photonic bandgap layer having a sensing material embedded therein.

* * * * *